United States Patent Office 3,716,717
Patented Feb. 13, 1973

3,716,717
FLAME DETECTOR AND ELECTRICAL
DETECTION CIRCUIT
Andreas Scheidweiler, Stafa, and Peter Muller, Oetwil am See, Switzerland, assignors to Gerberus A.G., Mannedorf, Switzerland
Filed May 28, 1971, Ser. No. 147,826
Claims priority, application Switzerland, Apr. 8, 1971, 5,193/71
Int. Cl. G02t 1/28
U.S. Cl. 250—217 F                                      8 Claims

ABSTRACT OF THE DISCLOSURE

A photoelectric transducer provides signals responsive to a flame; the signals are applied to frequency selective amplifiers, having their frequency ranges of amplification so set that the lower limit of the frequency band of one amplifier is not more than twice the frequency of the upper limit of the other amplifier, preferably each with frequency band width in the order of $\sqrt{2}$, adjacently located, so that harmonics of sensed frequencies are effectively excluded from amplification, while separate amplification channels amplify frequencies of different band width. The overall frequency band width of amplification is preferably between 2 and 40 Hz.

---

The present invention relates to a flame detector and an electrical detection circuit and, more particularly, to a flame detector in which a photoelectric transducer is coupled to an electrical recognition circuit to process the signals derived from the transducer and to provide an output signal indicative of presence or absence of a flame.

In many installations it is necessary to indicate presence or absence of a flame; apparatus such as fire alarms or the like, supervisory control for furnaces require sensing devices which sense whether a flame is present or not. Fire alarm devices have been proposed in which suitable photoelectric elements are arranged such that the visible, infrared (IR) and ultraviolet (UV) spectral ranges are sensed in a transducer such as a photocell, a photodiode, a phototransistor, or a photoresistance, and provide a representative electrical signal. An electrical circuit, connected to receive an electrical signal, then processes this signal to provide an output which is indicative of the presence or absence of a flame and provides a corresponding alarm or control signal. In actual industrial practice it frequently occurs that besides the radiation from the flames, other noise radiation is present. Thus, sunlight, radiation from lamps, infrared sources and the like may additionally be sensed by the transducers. The transducers must, therefore, be capable of distinguishing between the flames to be detected and the noise radiation. Thus, the flame detector must be so arranged that it selects the characteristics of flames to distinguish from incident noise radiation on the phototransducers.

One known arrangement utilizes a phenomenon that flames due to a first have a higher infrared portion than most of the noise radiation usually encountered. A pair of phototransducers of different spectral sensitivities are used, serially connected, and the electrical circuit will respond with an alarm signal only when the red to blue ratio exceeds a pre-determined threshold value. Flame detectors of this type can, however, respond to erroneous radiation if the infrared radiation is strong and no blue is present; conversely, strong blue radiation can mask strong infrared radiation due to a fire, so that no alarm will be given or, at least, the response sensitivity for actual flame radiation is undesirably reduced.

Another arrangement has been proposed in which the typical low frequency flicker, characteristic of flames, is used to distinguish from noise radiation. The electrical circuit includes a filter which passes only frequencies within a certain pre-determined frequency band, for example, 5–25 Hz., or 2–40 Hz. Arrangements of this type may, however, be spuriously triggered by reflections of noise radiation arising from periodically movable or rotatable parts having, just by chance, a similar frequency or, for example, due to flicker derived from fluorescent lamps. It has been tried to combine the arrangements and, by additional utilization of the wave lengths most common in flame radiation, to reduce the response to spurious radiation. For example, infrared filters can be placed in front of the photocell, or wave length of the most frequently arising noise radiation can be reduced again by filters responsive to specific wave lengths. This is possible, however, only to a limited extent since frequently infrared radiation is reflected also by movable or rotatable parts, so that spurious and erroneous responses can be triggered also with apparatus utilizing such systems.

It is an object of the present invention to provide a flame detector in which the characteristics of flames are better utilized, to reduce the response to spurious radiation and to decrease erroneous alarms. The flame detector should thus provide better reliability in operation by being less sensitive to spurious radiation than known devices.

SUBJECT MATTER OF THE PRESENT INVENTION

Briefly, at least one photoelectric transducer, such as a photocell, photodiode or the like, is located to be sensitive to the flame radiation, and has its output electrical signal provided to a detection circuit which includes frequency selection means, selective to at least two frequency ranges of the output signals which have a specific relationship to each other. The frequency ranges, preferably being amplified, are selected such that harmonics arising within the ranges are effectively excluded. To this end, the frequency ranges are so selected that the ratio of the upper to the lower limits of the frequencies, in the ranges, is at the most 2:1. A suitable ratio of the upper frequency limit to the lower frequency limit of each one of the ranges is $\sqrt{2}$, at the most, and, if so selected, then the frequency ranges can be adjacent each other. Thus, even second harmonics are excluded from separate amplification.

The separately selected frequency ranges provide output signals and an alarm signal is given only if at least two of the separately processed signals, in their respective ranges, exceed a pre-determined threshold value. This selection can be carried out, for example, by means of an AND gate.

The invention is based on the characteristics of the low frequency flicker of flames which is usually irregular, that is, non-periodic. Flames usually cause separate fronts of combustion to occur at random time differences, which, in turn, give rise to visible impulses sensed by the photoelectric transducers. The frequence of the various like impulses occurs within a certain low frequency range; the distance, in time, of the individual light impulses is, however, irregularly distributed. Thus, the output signal from a sensed flame, in contrast to a periodically operating light source, will not provide separate frequencies and their harmonics, but rather will be distributed through a more or less continuous frequency band. Radiation from a flame can thus be distinguished from periodic spurious radiation by determining if the variations of the received radiation are present in various frequency ranges. These frequency ranges are suitably so selected that periodic radiation which occurs within one frequency range is effectively excluded from being sensed by selecting the second frequency range such that harmonics of the periodics, such as the second or third harmonics, are beyond the second frequency range. If the frequency ranges are within 2–40 Hz. or 5–25 Hz., for example, then the upper limit of the higher frequency range may have, with respect to the lower limit of the lower frequency range, a ratio of at the most 2:1. This is insured when both frequency ranges are immediately adjacent and the ratio of upper frequency limit to lower frequency limit within any one range is at the maximum $\sqrt{2}$.

The invention will be described by way of example with reference to the accompanying drawings, wherein FIG. 1 is a schematic block diagram of the flame detector;

Figure 1:
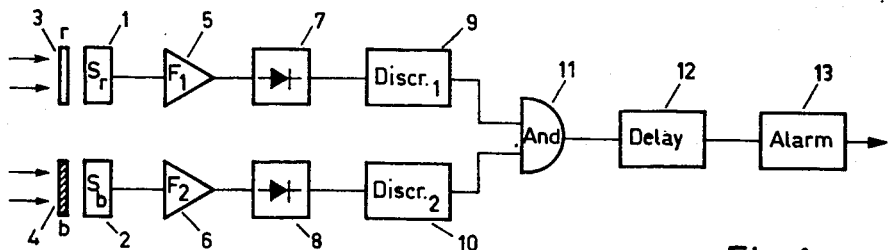

The schematic circuit diagram of FIG. 1 shows two photoelectric elements 1, 2, responsive to incident flame radiation. Elements 1, 2 may be photoresistors, photodiodes, photocells, phototransistors and the like. The output signals from the photoelectric transducer elements 1, 2 are conducted over two respective channels; connected to the photoelectric transducers are respective frequency selective amplifiers 5, 6. The frequency range, or band width of amplification of the amplifiers 5, 6, is selected to be different with respect to each other, and such that they are within the range of the flicker frequencies of the flames, for example, in the region of from 2–40 Hz. or from 5–25 Hz. To improve sensitivity and selectivity, a red or infrared filter 3 can be placed in advance of the phototransducer 1 associated with the amplifier 5. The higher frequency amplifier 6 may then have a filter 4, passing blue radiation placed in front of its associated transducer 2. It has been found that the lower frequency flame radiation has a greater proportion of red in its spectrum. Filters 3 and 4 are not strictly necessary. A single phototransducer can be used responsive to flame radiation, having its output connected to the two channels, the inputs of which are formed by the two frequency selective amplifiers 5, 6.

The output signals from amplifiers 5, 6 are transmitted over rectifiers 7, 8 threshold circuits, or to discriminators 9, 10. The circuits 9 and 10 operate as combined time and amplitude responsive threshold circuits and provide an output signal if and only if the input signals exceed a pre-determined threshold value for a pre-set period of time, that is, when the flame radiation signal is derived from the respective amplifier and transmitted thereby within its band pass width.

The output signals of discriminators 9 and 10 are applied to an AND gate 11 which supplies a signal only when both discriminators 9 and 10 supply an input thereto. The output signal of the AND gate 11 is transmitted over a time delay network 12 to an alarm system 13. The time delay suppresses false alarms, by suppressing short time signals. It can be omitted if flame detectors should respond rapidly.

The flame detector of this type responds only when the flame radiation varies in such a manner that frequencies in two frequency ranges arise.

Figure 2:
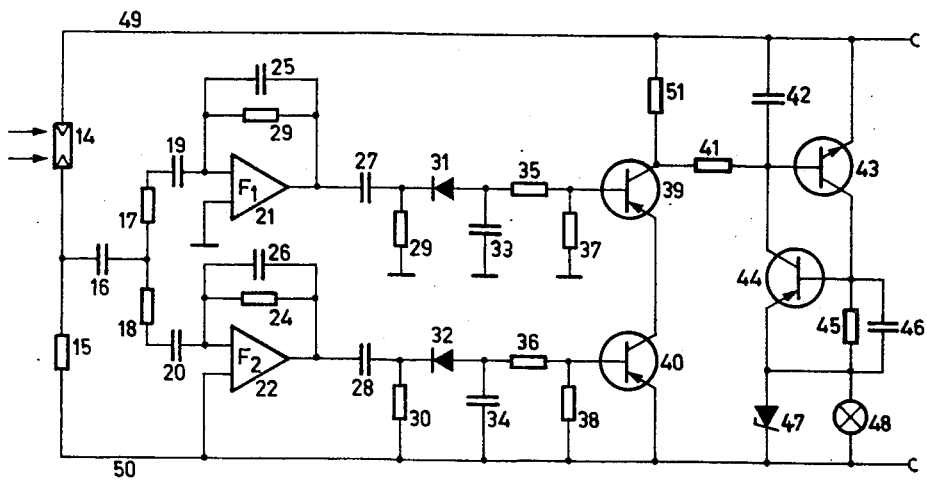
FIG. 2 is a schematic circuit diagram of a flame detector.

The circuit diagram of the flame detector is shown in FIG. 2. Radiation is recorded in a photosensitive resistance 14, connected in series with a fixed resistor 15 and, in turn, between two supply buses 49, 50. Change of potential across the photoresistance 14 is transmitted over a condenser 16 and resistances 17, 18, condensers 19 and 20, respectively, to two operational amplifiers 21, 22. Condensers 25 and 26 and resistances 23, 24 provide for selective feed-back of the amplifiers 21, 22. The frequency band widths of the two amplifiers are selected to be different, but they are within the frequency band width of the radiation from the flame. The frequency ranges are determined by condensers 19, 20 and 25, 26, as well as resistances 17, 18, 23, 24.

The output signals from amplifiers 21 and 22 are transmitted over condensers 27, 28 to two rectifier networks, formed of resistances 29, 30 and diodes 31, 32, as well as condensers 33, 34. Resistances 35, 37 and 36, 38, respectively, are voltage dividers, in which the rectified signals can be attenuated to such an extent so that transistors 39, 40 are triggered into conductive condition only above a pre-determined threshold value of the output signals from amplifiers 21, 22. Since transistors 21, 22 are serially connected, current can flow through resistance 51 only when both transistors are conductive, that is, are unblocked. The circuit thus functions as an AND gate. The voltage drop across resistance 51 is applied to a flip-flop stage formed of a pair of transistors 43, 44, which are interconnected by a feed-back circuit. A voltage drop across resistance 51 switches the flip-flop circuit into conductive condition. Resistances 41 and 45 form the base resistances for the two transistors and condensers 42 and 46 prevent spurious change of state due to voltage variations or surges arising across buses 49, 50. If the flip-flop circuit is in conductive condition, then alarm indicating current flows from a source to the buses 49, 50. Additionally, an indicator lamp 48, serially connected with the flip-flop circuit, will light. Zener diode 47 across lamp 48 stabilizes the lamp voltage.

Figure 3:
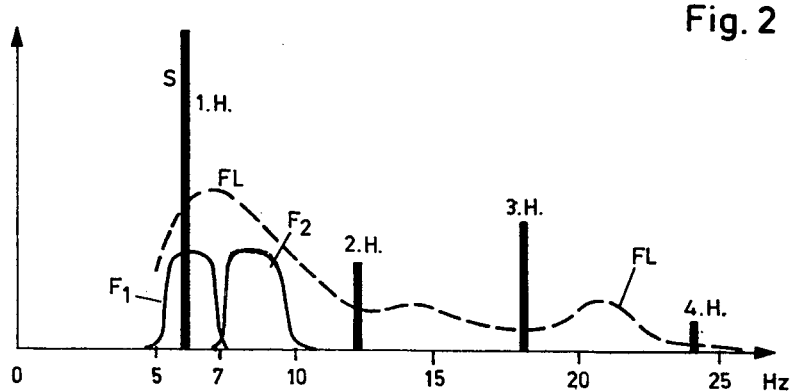
FIG. 3 is a frequency distribution curve of radiation and responses of the amplifiers used.

The operation of the circuit in accordance with the invention is best seen in connection with FIG. 3. Curve FL illustrates an example of flicker spectrum of a flame. A relatively broad, continuously occurring frequency between 4–10 Hz. is present, which extends in attenuated form up to frequencies of about 25 Hz.

The frequency spectrum of spurious noise radiation S is formed of a continuously operating light source, the radiation from which is interrupted by a mechanical shutter about 6 times per second. Such a light source will have a line spectrum with a base frequency of 6 Hz. and additionally will have harmonics at the second, third, fourth, fifth . . . etc. multiple of the base frequency.

The frequency pass width of the two amplifiers 5, 6, in the example of FIG. 2 amplifiers 21, 22, is preferably so selected that if the base frequency of spurious radiation falls in the frequency band width of one amplifier, a harmonic thereof does not fall within the frequency band width of the other. This is achieved by arranging the upper limit of the higher frequency range to be at the most twice the frequency of the lower limit of the lower range. Ideally, both frequency ranges have a relative width of about $\sqrt{2}$ and are immediately adjacent. Such a relationship is indicated in FIG. 3 by curves $F_1$ and $F_2$. This insures that the base frequency of spurious radiation will never have a harmonic which is within the frequency range being covered by the two channels. Since most spurious radiations have second harmonics which are substantially less intense than the third harmonic, the danger of a spurious alarm by simultaneous occurrence of both the second and third harmonic is small.

The example illustrated utilizes a frequency range between 5–10 Hz. Depending on the spectral distribution of the flicker to be expected from the particular flame, the frequency range can be selected to be matched thereto. Flames with rapid flicker preferably utilize flame detectors in which the range is selected between 10–20 Hz. The width of the two frequency ranges can likewise be matched to the spurious radiation to be expected. If harmonics of wholly different order are expected, lesser frequency widths than $\sqrt{2}$ may be preferable.

The photoelectric elements can be combined with the electrical network to a single mechanical unit. Alternatively, the electrical network can be separated out and installed in a signal center, responsive to various photo elements which are connected to the signal center over common or individual lines. The signals are processed in the circuit, whether located at the photoresistance or in a central location.

Figure 4:
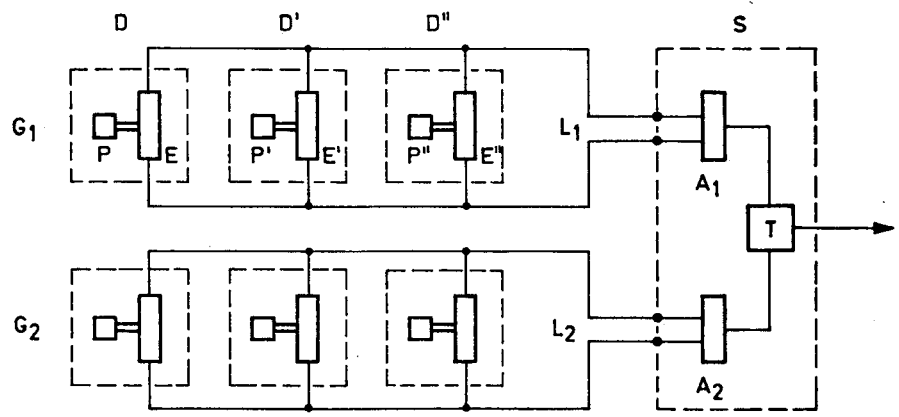
FIG. 4 is a schematic circuit diagram, in block form, of one form of a flame alarm system.

The circuit of a combined flame detector and photosensitive transducer is illustrated in FIG. 4. A signal center S has a pair of groups G1, G2, of flame detectors connected thereto over conductor pairs $L_1$, $L_2$. Each of the two groups has one or more several flame detectors, D, D' and D", all connected in parallel. Each of these flame detectors includes a photoelectric element P and an associated electrical network E, combined into one mechanical unit. If any one of the photoelectric elements P, P' or P, P" senses radiation from a flame, the resistance of the associated electrical network E, E', E" will decrease so that the pair of conductors $L_1$, $L_2$ will carry a higher current. Alarm units $A_1$ and $A_2$ in signal center S indicate the presence of an increased current as a characteristic for an alarm condition. The signal center will give a visual and/or audible alarm signal.

Special indicator arrangements on the various alarm units can be used to determine which one of the detector groups D, D' or D" give rise to the alarm. The signal center may further include a control unit T, connected to the various alarm units $A_1$, $A_2$ to indicate an alarm condition to an external point, for example, fire department, police department or other public or private supervisory agency.

Figure 5:
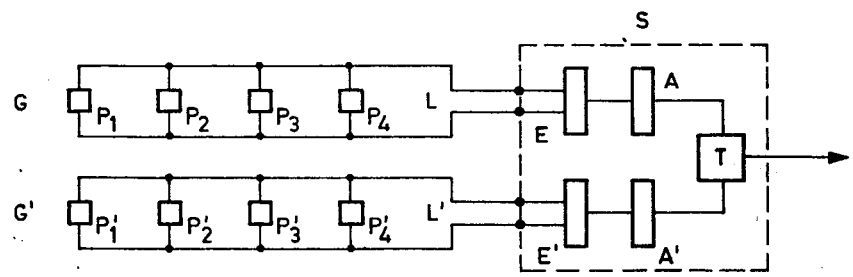
FIG. 5 is a schematic circuit diagram of a further form of a flame alarm system.

FIG. 5 illustrates a flame detector arrangement in which the connection to lines L, L' is not by complete combinations of radiation sensitive devices and circuits but rather by groups G, G' of parallel photoelectric transducer elements $P_1$, $P_2$, $P_3$ and $P_4$. The output signals of the photoelectric transducers are conjointly applied to associated electrical networks E, E', respectively, arranged within the signal center S. The output signal of the electrical network, that is, the increased alarm current, is applied to alarm devices A, A' within the signal center. The alarm devices A, A' in turn trigger a visual or acoustic alarm signal. It is also possible to apply signals arising in the alarm devices A, A' respectively to a transfer and control device T which provides an alarm condition indication at a remote point.

The present invention has been described in connection with a flame detector to detect the presence of a flame. Of course, it can be equally modified to give alarm upon the absence of a flame, that is, when no signal is present on the radiation detector, for example, upon sudden drop of supply current to buses 49, 50.

Various changes may be made within the circuit network, and the utilization circuit, as well as within the alarm system, within the scope of the inventive concept. The individual network elements have been described essentially in block form. Rectifiers, diodes and operational amplifiers are well-known components. The inclusion of condenser 33, 34, in combination with resistances 35, 37 and 36, 38, respectively, provides for some delay in the transfer of the signals to the output circuit. Delays can additionally be interposed between transistors 39, 40 and transistors 43, 44 or to delay the response of the flip-flop network formed of transistors 43, 44, upon change of the voltage across resistance 51. Suitable choice of condenser 42 and resistor 41 will introduce additional time delays.

We claim:

1. Flame detector having at least one photoelectric element means exposed to flame radiation and providing an output signal, and a detecttion circuit connected to the photoelectric element means and providing a signal indicative of presence or absence of a flame, said circuit comprising frequency selective means selecting at least two frequency ranges of the output signal from the photoelectric detector, the frequency ranges falling within 2–40 Hz., the frequency ratio of the upper limit of the higher frequency channel to the lower limit of the lower frequency channel being at the most 2:1, and the band width of each of the two frequency channels being at the most $\sqrt{2}$, and the upper frequency limit of the lower frequency channel being adjacent the lower frequency limit of the upper frequency channel;

means separately conducting said signals, within said separate frequency ranges, to provide separate processed signals;

and means providing an output signal if, and only if at least two of said separately processed signals exceed a selected threshold value.

2. Flame detector according to claim 1, wherein the means separately conducting the signals comprises a pair of amplification channels to amplify separate bands of frequencies;

and said means providing for an output signal comprises an AND gate connected to said channels and providing the output signal.

3. Flame detector according to claim 2, wherein the amplifiers are frequency selective and include a threshold circuit to provide an output from the amplifiers only if a predetermined amplitude is exceeded.

4. Flame detector according to claim 1, wherein the photoelectric means comprises a single photocell connected to said frequency selective means.

5. Flame detector according to claim 1, wherein the means providing output signals comprises an AND gate, said AND gate having a pair of transistors with series connected collector-emitter paths, the bases of said transistor being connected to one each of said frequency selective means.

6. Flame detector according to claim 2, including a bistable circuit controlled by the AND gate.

7. Flame detector according to claim 1, wherein the photoelectric means and the circuit are joined to form a structural unit connected to a central station.

8. Flame detector according to claim 1, wherein the detection circuit is arranged in a central signal station; and a plurality of photoelectric means are connectable to the central signal station.

References Cited

UNITED STATES PATENTS

| | | | |
|---|---|---|---|
| 2,722,677 | 11/1955 | Krueger | 340—228.2 |
| 3,609,364 | 9/1971 | Proffit | 340—228.2 |
| 2,692,962 | 10/1954 | Thomson | 340—228.2 |
| 2,762,033 | 9/1956 | Krueger | 340—228.2 |
| 2,811,711 | 10/1957 | Cade | 340—228.2 |

JAMES W. LAWRENCE, Primary Examiner

D. C. NELMS, Assistant Examiner

U.S. Cl. X.R.

340—228.2